Sept. 10, 1940.                L. O. GILL                2,214,018
                              PAPER SIZING
                           Filed July 16, 1936
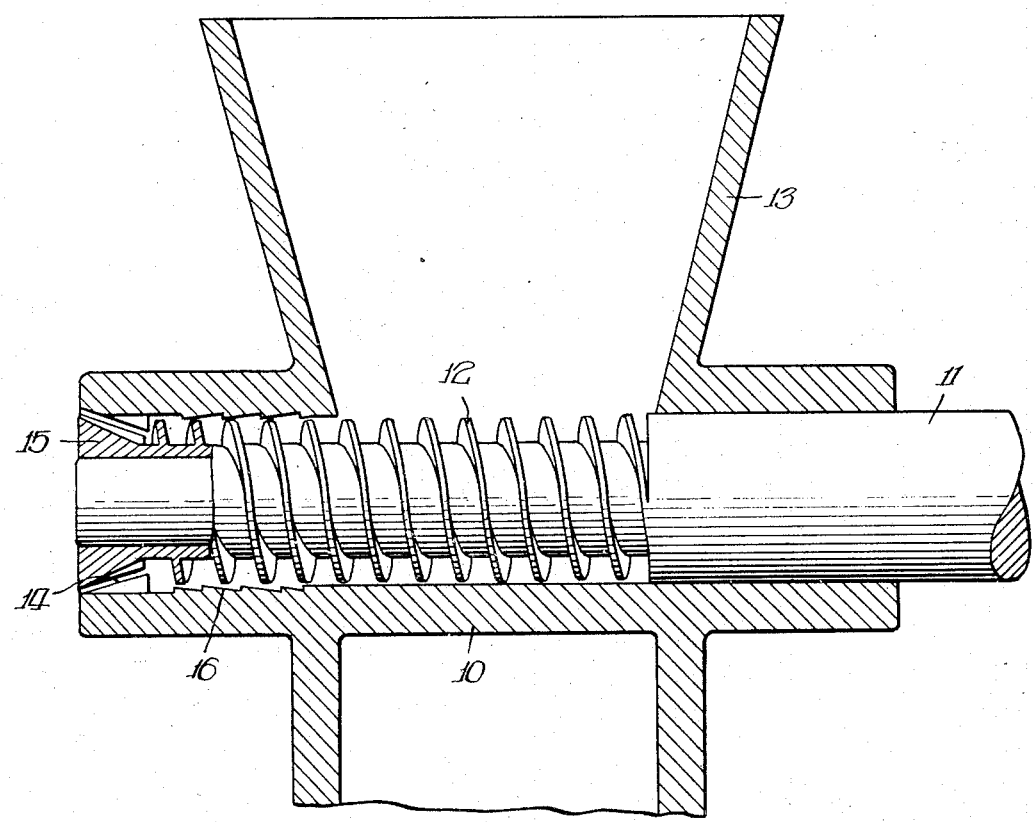
Inventor:
Lowell O. Gill,
By Cromwell, Treist & Warden
                          Attys.

Patented Sept. 10, 1940

2,214,018

UNITED STATES PATENT OFFICE 2,214,018

PAPER SIZING

Lowell O. Gill, Decatur, Ill., assignor to A. E. Staley Manufacturing Company, Decatur, Ill., a corporation of Delaware Application July 16, 1936, Serial No. 90,855

2 Claims. (Cl. 92—21)

This invention relates to the production of starch products and pertains in particular to an improved type of corn starch for uses such as in the manufacture of paper.

A principal object of the invention is to produce an improved corn starch product which may be employed as a size for paper by addition to the beaters without a preliminary cooking operation.

An additional object of the invention is the provision of an improved method for the manufacture of starch products, the method being based upon the effect of extruding the starch through a restricted opening under pressure.

Still another object is the provision of a starch product having cells which are distorted by physical means.

These and other objects will be seen from a consideration of the following specification and by reference to the accompanying drawing, in which the single figure is a diagrammatic view of apparatus of the type employed in my improved method.

In the production of many papers it is customary to employ starch as a sizing material. The starch has several beneficial effects including an improvement of the finish of the sheet and an increase in the bursting strength, the tensile strength and the efficiency of rosin sizes with which the material is used. For this purpose there have been employed a gelatinized starch prepared by boiling starch with water and a highly converted starch which permits or enhances gelatinization by the heat of the drying rolls encountered in the paper-making process.

The present invention has to do with the production of an improved starch product which may be used for this or other purposes and is based upon my discovery of the effect of extruding starch through a restricted opening in the manner to be described more particularly hereinafter.

In my process, starch produced by the well known wet milling process is subjected in a relatively dry condition to distortion by physical means by being forced under considerable pressure through an annular orifice. This orifice and the necessary pressure desirably are provided by an expeller of the type shown somewhat diagrammatically in the drawing. The expeller includes a body portion 10 having a longitudinally extending impeller shaft 11 provided with helical compression threads indicated at 12. A hopper 13 is mounted above the feed end of the shaft 11 and starch is transferred from this hopper toward the compression end of the expeller. At the compression end of the machine the body portion terminates in an annular outwardly flared portion 14. The shaft 11 terminates in a conical head 15 which with the portion 14 of the body forms a narrow annular opening through which the starch finally is extruded. In many cases it will be found desirable to utilize a series of compression augmenting elements of well known construction such as indicated at 16.

Starch in a relatively dry condition and preferably having a moisture content between substantially 13 per cent and 17 per cent is loaded into hopper 13. The compression screw may be of the type which rotates at a rate of the order of 300 R. P. M. At this rate sufficient pressure is applied to extrude the starch through the compression end of the machine, including the annular orifice between members 14 and 15. In one embodiment of the invention the position of the member 15 with respect to the cone 14 is regulated so as to provide a clearance therebetween of btween 0.012 and 0.026 inch. The physically distorted starch as it issues from the expeller may be in the form of an irregular tube having numerous holes and having its walls considerably puffed by the escape of vapor. The expeller cake expands to some extent and may have a sponge-like structure with numerous interstices between the particles.

In the compression end of the expeller the starch particles are violently contacted by the elements of the machine and by other particles. The particles exert a mutual rubbing action as the starch mass is contorted under compression by the expeller screw and the walls of the machine. The pitch of the expelling screw and the shape of the expeller barrel or body portion are such that the desired pressure and friction for mechanically distorting the starch cells by physical means are obtained. The resulting mechanical distortion of the starch granules apparently is enhanced by the heat of friction developed during the extrusion.

The flaking operation by which the starch granules are physically distorted is rapid. For instance, a single expeller may produce about 700 pounds of properly treated flakes per hour. The particular nature of the product resulting from the described treatment will depend upon such factors as the construction of and the amounts of pressure and frictional effect obtained by the expeller. That is, the nature and extent of the physical distortion will vary to some extent, depending upon the particular nature of the treatment.

After the extruded flakes are discharged from the expeller, they may be ground into small particles which facilitate use of the product in a liquid medium. When the product is examined by microscope under proper conditions in a water suspension there will be observed numerous lacy irregular particles together with a large proportion of more or less distorted starch cells and cell fragments. After soaking for some time, most of the larger particles disintegrate to such an extent that the individual cells of which they are composed plainly can be seen. The small size of the final particles allows excellent distribution to be obtained in the water medium, and when the material subsequently is combined with paper the physical improvement of the paper is great.

In the use of my improved product in the making of paper, the product may be added to the beater in which fibre and pulp are properly disintegrated and hydrated, the addition preferably being made a sufficient time prior to dumping the beater to obtain an even distribution. Thereafter, no further precautions need be taken. The stuff to which the product is added is processed in the usual manner by formation into a web and drying. The resulting paper will be found to have particularly desirable characteristics from the standpoints of surface, strength and ink-resistance. It will be noted that no cooking or change in the usual paper-making procedure are required. A further characteristic of the improved starch product is that it may be used in the manufacture of paper without the formation of objectionable "shiners". This may be due at least, in part to the fine state of division which is obtained upon soaking the particles in water and upon the readiness and completeness with which the particles are hydrated to produce a smooth water product.

Use of the improved product is not confined to paper sizing. The peculiar effect of the extrusion process produces changes in the structure of the starch cells which improves the action of the starch for other purposes. Apparently the distortion to which the starch cells are subjected alters the outer surface of the cells to such an extent that water will penetrate the cell without the necessity for boiling the starch in a water suspension or for chemical treatment. However, such steps additionally may be found advantageous under certain circumstances.

The degree of physical distortion of the starch cells may vary to a considerable extent, as may the method of treatment. In this connection it will be understood that the particular structure of the expeller shown in the drawing for the purpose of illustration is not essential. The various changes which may be made in the product and method without departing from the scope of the invention are intended to be included in the appended claims.

I claim:

1. In the formation of a paper web by the process which includes producing a beater suspension of fibrous particles and hydraulically depositing said fibres in the form of a web, the improvement which comprises combining with the beater suspension starch modified by frictional extrusion under sufficient pressure to physically distort the starch cells and to render the same dispersible in water without cooking.

2. In the formation of a web of paper by the process which includes producing a beater suspension of fibrous particles and hydraulically depositing said fibres in the form of a web, the improvement which comprises combining with the beater suspension starch modified by extrusion through an opening of the order of 0.012 to 0.026 inch with a moisture content of 13 to 17 per cent and under sufficient pressure to physically distort the starch cells and to render the same dispersible in water without cooking.

LOWELL O. GILL.